No. 878,229. PATENTED FEB. 4, 1908.
G. M. OLSON.
AUTOMATIC WAGON BRAKE.
APPLICATION FILED JULY 19, 1907.
2 SHEETS—SHEET 1.
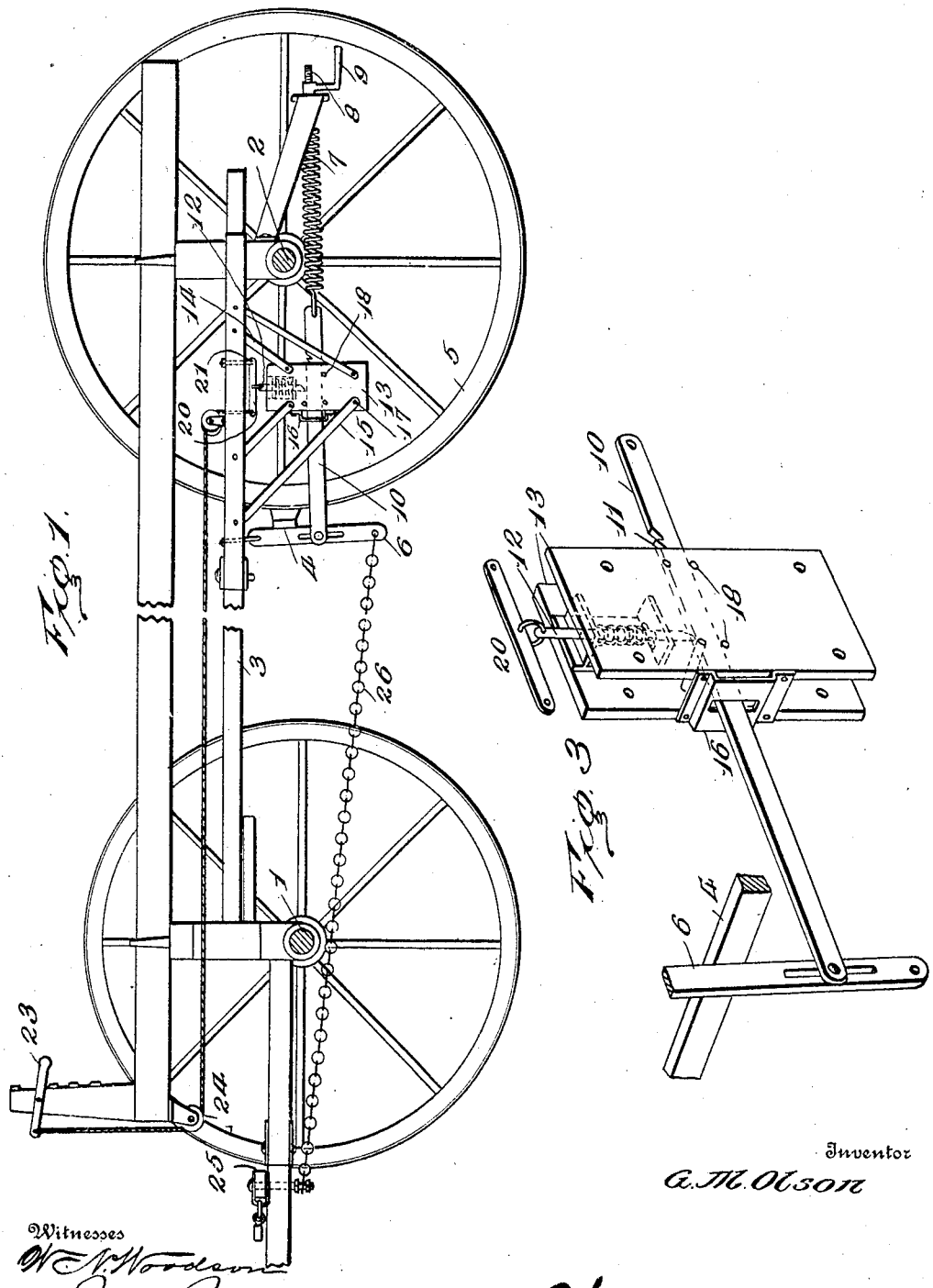

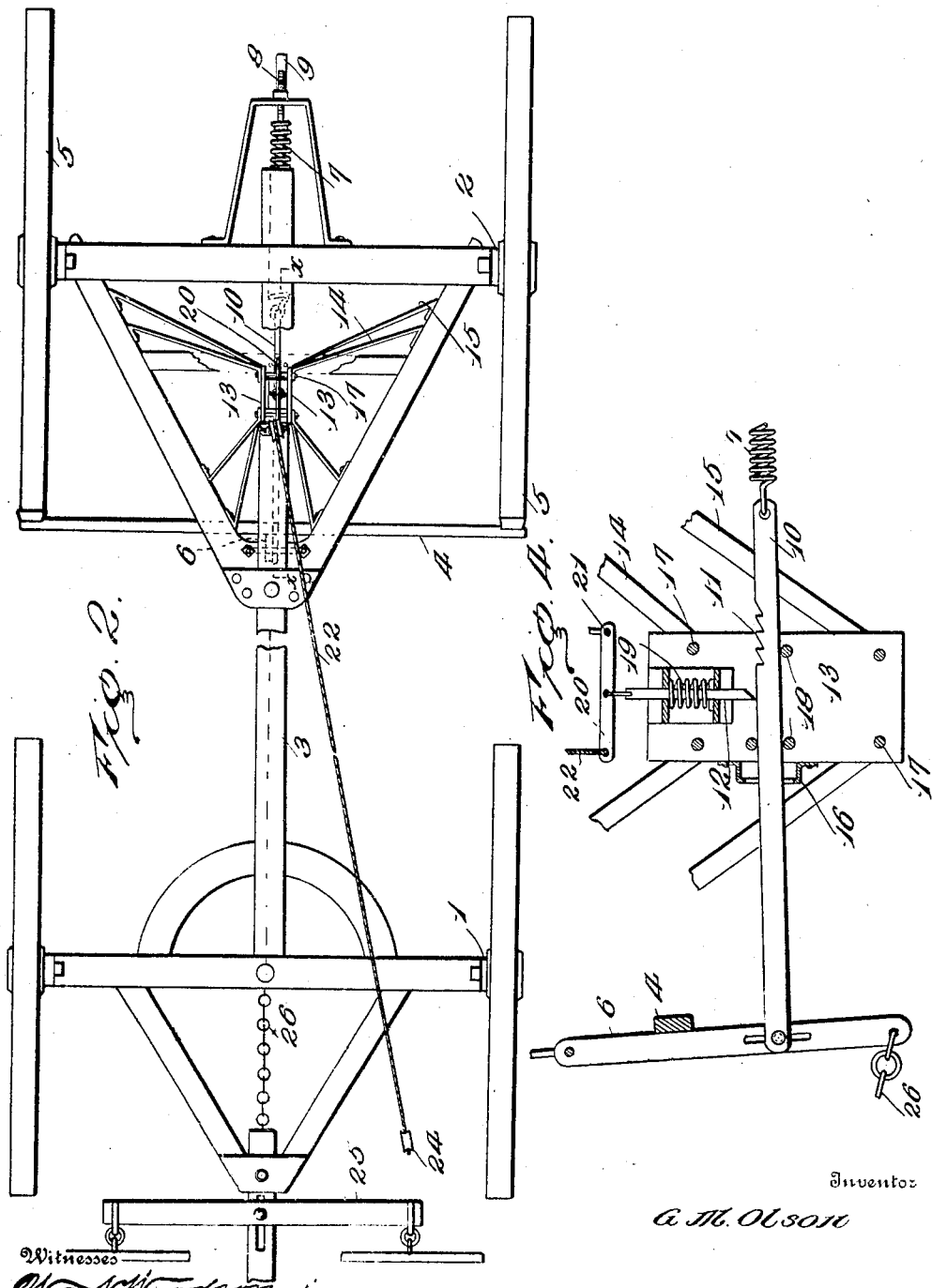

UNITED STATES PATENT OFFICE.

GARDNER M. OLSON, OF COKATO, MINNESOTA.

AUTOMATIC WAGON-BRAKE.

No. 878,229.         Specification of Letters Patent.         Patented Feb. 4, 1908.

Application filed July 19, 1907. Serial No. 384,578.

*To all whom it may concern:*

Be it known that I, GARDNER M. OLSON, citizen of the United States, residing at Cokato, in the county of Wright and State of Minnesota, have invented certain new and useful Improvements in Automatic Wagon-Brakes, of which the following is a specification.

This invention pertains to brake mechanism for wagons, the purpose being to provide a novel brake mechanism which in the main is controlled by the draft and which may not be set so long as force is required to be exerted to draw the wagon over the road or field.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a farm wagon provided with a brake mechanism embodying the invention. Fig. 2 is a horizontal section of the wagon in a plane above the axles. Fig. 3 is a detail view of the brake and the adjunctive parts. Fig. 4 is a detail vertical section taken on the line $x$—$x$ of Fig. 2.

Corresponding and like parts are referred to in the following description and indicated in all the views of the drawings by the same reference characters.

The wagon shown is of ordinary construction, being illustrated to demonstrate the application of the invention. The front axle 1, rear axle 2, and reach 3 are of ordinary construction and arrangement. The brake-beam 4 is suspended over the reach or other part of the running gear in any well known manner and is provided with brake-shoes which coöperate with the rear wheels 5. A swinging bar 6 having connection with the brake-beam 4 or carrying the same, is normally drawn rearward at its lower or front end by means of a spring 7 so as to apply the brake when the latter is released. The tension of the spring 7 may be regulated by means of a threaded rod 8 which is adapted to be turned by means of a crank 9. The tension of the spring 7 determines the force with which the brakes are set. A bar 10 connected with the spring 7 likewise makes connection with the swinging bar 6 and is directed in its movements by means of a guide. The bar 10 is provided with a series of notches 11, which are adapted to be engaged by means of a spring actuated lock bolt 12 so as to hold the bar 10 when drawn forward and thereby prevent application of the brakes except as herein provided. The bar 10 operates between plates 13 which are connected with the reach or other convenient part of the running gear by means of braces 14 and 15. A strap 16 connects the plates 13 and is apertured to admit of the bar 10 passing freely therethrough. The plates 13 may be connected in any maner, as by means of the bolts or fastenings 17 which connect the braces 14 and 15 thereto. Other bolts or fastenings 18 connect the plates 13 and are vertically spaced and receive between them the bar 10. The lock bolt 12 is spring actuated and is mounted in webs or connecting pieces between the plates 13. A spring 19 for actuating the lock bolt 12 is mounted thereon and confined between a stop on said lock bolt and a stop formed by the mounting of said lock bolt. A lever 20 fulcrumed at 21 is connected intermediate of its ends by means of a link with the lock bolt 12 and its front end is connected by means of a cord, chain, or the like 22, with an operating lever 23 within convenient reach of the driver, said flexible connection 22 passing over suitable directing pulleys 24.

The double-tree 25 is connected by means of a chain 26 or like part, with the lower end of the swinging bar 6 and has a limited movement and when pulled upon moves the brake-beam so as to carry the brake-shoes away from the rear wheels 5, the lock bolt 12 snapping into one of the notches 11 and holding the bar 10 drawn forward and the brakes out of action. So long as draft is applied to draw the load the brakes cannot be applied. When going down grade or when the draft is relaxed from any cause, the brakes may be automatically set by the spring 7 upon releasing the bar 10 which may be accomplished by operating the lever 23. The force with which the brakes may be set is adapted to be regulated by varying the tension of the spring 7, this being accomplished by operating the tension or set screw 8.

Having thus described the invention, what is claimed as new is:

1. In combination, a brake device, a longitudinally movable bar connecting with said brake device, a spring normally exerting a pressure upon said bar and tending to set the brakes, a guide comprising spaced plates to receive between them the said bar, a lock bolt mounted upon said plates and coöperating with said bar to hold the brakes released, and means for applying the draft to the said bar to hold the brakes out of action.

2. In combination, a brake device, a longitudinally movable bar having connection with said brake device, a spring connected with said longitudinal bar and normally exerting a force thereon to apply the brake, transversely spaced plates having said longitudinal bar arranged between them, means for connecting said plates and directing the longitudinal bar in its movements, a lock device mounted upon said plates and coöperating with the longitudinal bar to hold the brake out of action, and means for releasing said lock device to permit automatic action of the brakes.

In testimony whereof I affix my signature in presence of two witnesses.

[L. s.]  GARDNER M. OLSON.

Witnesses:
 CLYDE F. OLSON,
 ABBIE M. OLSON.